Figure 1:
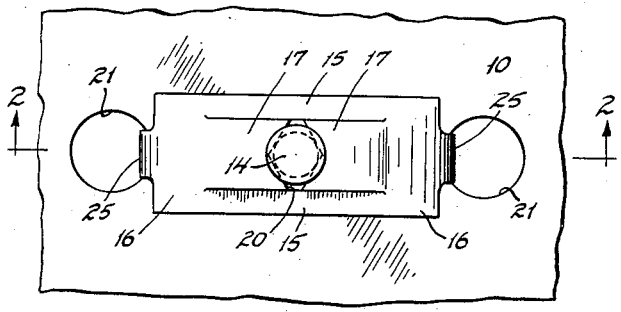

Sept. 15, 1936.   G. A. TINNERMAN   2,054,471
SPRING FASTENER

Filed April 29, 1935

INVENTOR.
George A. Tinnerman
BY
Bates, Goldrick, & Teare
ATTORNEYS

Patented Sept. 15, 1936

2,054,471

UNITED STATES PATENT OFFICE 2,054,471

SPRING FASTENER

George A. Tinnerman, Rocky River, Ohio, assignor to Albert H. Tinnerman, Cleveland, Ohio Application April 29, 1935, Serial No. 18,784

1 Claim. (Cl. 85—36)

This invention relates to spring fasteners and particularly to those which are used in place of a nut for engaging a bolt and cooperating therewith to lock two or more articles together. Spring fasteners of this general type have comprised a body portion with a pair of tongues that project upwardly therefrom and that are sufficiently yieldable for enabling the bolt to be inserted thereinto, merely by a longitudinal motion, and thereafter, locked by imparting a few turns to the bolt. A fastener of such construction is illustrated in Letters Patent of the United States No. 1,512,653, which were issued Oct. 21, 1924.

The fastener, which is shown in Patent #1,512,653, is adapted to be positioned against one of the faces of the article, with the ends of the tongues in registration with the opening through which the bolt is intended to be passed. With such construction, it has been necessary for an operator to hold the fastener in place with one hand, while the bolt is being turned with the other hand. This construction is satisfactory where there is ample room for an operator to use both hands, but its usefulness is limited to those operations in which there is sufficient room for the operator to work. In the present day automotive construction, however, there are many parts, in which spring fasteners would be recommended, except for the fact that access cannot readily be had for holding the fastener in place during the bolt applying operation. The trade in such instances therefore, has resorted either to a nut which is rigidly fastened to the underside of one of the articles, or to a drilled and tapped opening of one of the metallic parts.

In many parts of automobile body construction, metallic plates are being replaced by sheets of compressed fibrous material, so as to reduce the cost of construction. This is particularly true in the construction of arm rests, door panels and other interior upholstered parts. In such instances, it is impractical to use the fastening means, which heretofore has been regarded as necessary, because of the fact that the fibrous sheet is not adapted to be threaded because it is sufficiently compressible to preclude the making of a tight joint by means of the customary nut.

An object of my invention is to so construct a spring fastener that it may be readily applied to a sheet of fibrous material and fastened thereto in registration with a bolt opening therein, so as to obviate the necessity for holding it in place by a workman, during the bolt attaching operation.

A further object is to make a spring fastener, which can be readily fastened into place in the sheet without the use of the tools or other fastening parts, and which will remain firmly in the desired position before the sheet is applied to the automobile body, or other article to which it may be attached, thus facilitating the work of assembly, and materially reducing the labor item in an assembly operation.

In addition, the invention contemplates a fastener construction by means of which the fastener may be entirely concealed from view, and located in position where the workman does not have access to it, and yet so firmly retained in place that a bolt may be quickly inserted and locked into position thereagainst.

Figure 2:
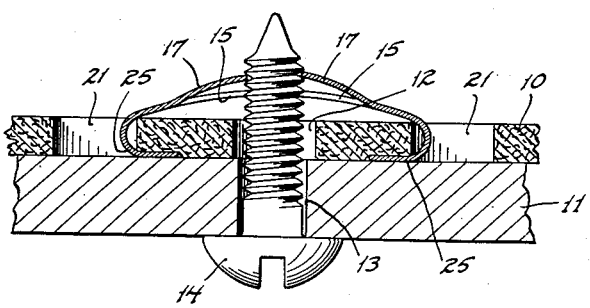
Figure 3:
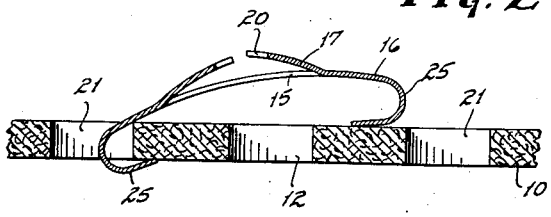
Figure 4:
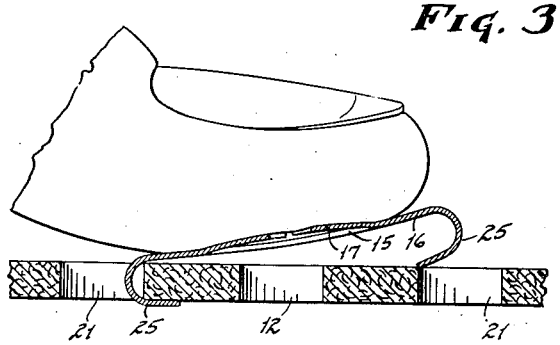
Figure 5:
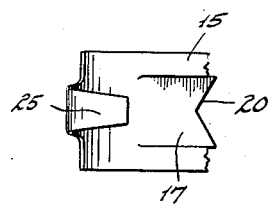
Figure 6:
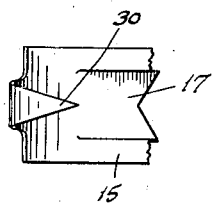
Figure 7:
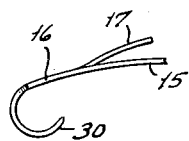

In the drawing Fig. 1 is a top plan view of a fastener which is made in accordance with my invention; Fig. 2 is a section taken on the line 2—2 in Fig. 1; Fig. 3 is a section through an article with which my fastener is adapted to be used, the fastener being shown in its initial position for attachment to the article; Fig. 4 illustrates another position of the fastener, which is shown in Fig. 3, showing the attaching operation; Fig. 5 is a bottom view of one end of the fastener, such as is shown in Figs. 1 to 4; Fig. 6 is a bottom view of one end of the fastener and illustrates an attaching part that is a modification of the construction shown in Fig. 5; Fig. 7 is a fragmentary side elevation of the fastener that is shown in Fig. 6.

In Figs. 1 and 2, 10 indicates a layer of fibrous material in compressed sheet form that is to be attached to a part 11 which may be of metal or any other desired material. The part 10 has a bolt opening 12 therein, which registers with a similar opening 13 in the part 11. These openings are designed to receive the shank of a bolt 14. In the form illustrated, the bolt is threaded and the head of it is in contact with the outer face of the part 11.

The nut or spring fastener which I have shown in connection with the bolt 14 has a body portion that is normally arched upwardly and that comprises longitudinal portions 15 that are connected by end portions 16 as is shown particularly in Fig. 1. Tongues 17 are formed integrally with the body portion and are arranged to extend upwardly from the end portions 16 of the longitudinal portion 15. The ends of the tongues may be indented as is indicated at 20, in Fig. 5. The indentation may be curved or of other suitable contour as desired, in accordance with the size and type of bolt with which the fastener is intended to be used.

To hold the fastener against the sheet 10, I provide openings 21 in the sheet, and I position the openings adjacent the ends of the fastener. The distance, however, between the adjacent edges of the openings 21 is determined by the length of the fastener. These openings, as shown in Fig. 1, are preferably stamped in the sheet in such manner that the axes thereof and the axes of the opening 12 lie substantially in a common plane. The fastener has fingers 25, which project from the ends of the body portion and are adapted to extend through the openings 21 and behind the sheet 10. To this end, the fingers are bent downwardly and thence inwardly, both underhanging the body portion, but spaced therefrom. The normal position of the fingers, when the fastener is detached from a sheet is substantially parallel to the body portion. Furthermore, the tongues 20 are spaced so that the fastener must be sprung downwardly before the tongues can be inserted into place.

Inasmuch as the attaching of the fastener to the sheet is accomplished by springing the fastener, it is obvious that it may be applied without requiring tools and that it will be retained in place, merely by the resiliency in the body of the fastener.

To illustrate the attaching operation, Fig. 3 shows a fastener, with one finger extending through the opening 21 and with the other resting upon the top of the sheet 10. Fig. 4 shows the effect of pressure that may be exerted manually upon the fastener and illustrates the upper tongue about to be forced into its associated opening 21. At the completion of the pressure operation, the upper finger slips downwardly through the sheet and engages the bottom face thereof, as is illustrated in Fig. 2. At such time the resiliency in the body portion draws the two ends forcibly toward each other, thereby effectively retaining the fastener in bolt receiving position against the sheet.

The fingers 25 illustrated in Fig. 2 and Fig. 5 are well adapted for retaining the fastener in the desired position against any material in sheet form. However, to retain the fastener more effectively against fibrous material in sheet form, I prefer to form the fingers as points, as illustrated at 30 in Fig. 6, and to curve them both inwardly and toward the body portion, as is shown in Fig. 7. In this way, the fingers enter the material and pierce, or tend to pierce, the same making a very secure joint therewith.

While I have shown in Fig. 2 my invention in connection with a screw having a cylindrical threaded shank, and a pointed end, it is important to note that the invention is well adapted for use with a wood screw having the usual tapered and threaded shank. In many installations, wood screws are more desirable, particularly because they can be made more economically than the machine screws.

The fastener made in accordance with my invention has accomplished a two-fold purpose in that it has obtained an efficient and simple arrangement for effectively locking a fastener in place and has provided an effective way for incorporating a fastener with a sheet of fibrous material. The invention has solved a difficult problem in automotive and kindred construction, and has greatly facilitated the use of fibrous material, as a backing sheet for upholstered parts.

I claim:

A spring fastener comprising a body portion of ribbon-like material having a bolt receiving opening extending therethrough, means extruded from the body portion and movable with relation thereto for yieldably engaging the shank of a bolt, the body having its ends bent inwardly on the bottom thereof to provide work engaging hooks, and the body being arched between the hooks to impart resiliency by means of which the fastener may be supported in bolt receiving position against the work solely by spring tension.

GEORGE A. TINNERMAN.